US010417604B2

(12) United States Patent
Weiss et al.

(10) Patent No.: US 10,417,604 B2
(45) Date of Patent: Sep. 17, 2019

(54) DEVICE ASSOCIATION-BASED LOCATING METHODS (71) Applicant: Location Labs, Inc., Emeryville, CA (US)

(72) Inventors: Andrew Weiss, San Ramon, CA (US); Scott Hotes, Berkeley, CA (US); Joseph Anakata, Alameda, CA (US); Costandino Dufort Moraites, Berkeley, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 753 days.

(21) Appl. No.: 14/987,572

(22) Filed: Jan. 4, 2016

(65) Prior Publication Data

US 2016/0117639 A1 Apr. 28, 2016

Related U.S. Application Data (62) Division of application No. 14/098,769, filed on Dec. 6, 2013, now Pat. No. 9,232,495.

(51) Int. Cl.
*G06Q 30/00* (2012.01)
*G06Q 10/08* (2012.01)
(Continued)

(52) U.S. Cl.
CPC ..... *G06Q 10/0835* (2013.01); *G06Q 30/0635* (2013.01); *H04W 4/02* (2013.01);
(Continued)

(58) Field of Classification Search
CPC . G06Q 30/0601–0645; G06Q 30/0635; G06Q 10/0835; H04W 64/006; H04W 4/02; H04W 4/20; H04W 8/005; H04W 80/045
(Continued)

(56) References Cited

U.S. PATENT DOCUMENTS 6,587,835 B1 7/2003 Treyz et al.
7,995,988 B2 8/2011 Filizola et al.
(Continued)

OTHER PUBLICATIONS

Rania Abdelhameed, Sabira Khatun, Borhanuddin Mohd Ali and Abdul Rahman Ramli. Application of Cell-phonien Laptop Security. 2005. Journal of Applied Sciences 5 (2). pp. 1-5. (Year: 2005).*
(Continued)

*Primary Examiner* — Jeffrey A. Smith
*Assistant Examiner* — Allison G Wood
(74) *Attorney, Agent, or Firm* — Dovas Law, P.C.

(57) ABSTRACT

A device locating method includes broadcasting by a first mobile device a signal comprising an identifier associated with the first mobile device. A second mobile device receives and measures the signal broadcast by the first mobile device to produce one or more signal measurements. The second mobile device transmits the identifier associated with the first mobile device and the one or more signal measurements to a computing system. The computing system receives the identifier associated with the first mobile device and the one or more signal measurements from the second mobile device. The computing system estimates a location of the first mobile device based on the one or more signal measurements, and the location is transmitted to a user associated with the first mobile device. A traffic flow determination method, product ordering method and associated systems are also provided.

6 Claims, 7 Drawing Sheets

(51) Int. Cl.
  *H04W 64/00* (2009.01)
  *G06Q 30/06* (2012.01)
  *H04W 4/02* (2018.01)
  *H04W 4/20* (2018.01)
  *H04W 8/00* (2009.01)
  *H04W 80/04* (2009.01)

(52) U.S. Cl.
  CPC .............. *H04W 4/20* (2013.01); *H04W 8/005* (2013.01); *H04W 64/006* (2013.01); *H04W 80/045* (2013.01)

(58) Field of Classification Search
  USPC .................. 705/26.1–27.2; 455/115.1, 456.1
  See application file for complete search history.

(56) References Cited

U.S. PATENT DOCUMENTS

| | | |
|---|---|---|
| 8,315,905 B1 | 11/2012 | Adair |
| 8,504,057 B2 | 8/2013 | Choi et al. |
| 2003/0060197 A1 | 3/2003 | Benes et al. |
| 2004/0186776 A1 | 9/2004 | Llach |
| 2005/0039206 A1 | 2/2005 | Opdycke |
| 2007/0037582 A1 | 2/2007 | Mohi et al. |
| 2007/0085662 A1* | 4/2007 | Matsumoto ........ G07C 9/00103 340/10.1 |
| 2007/0088610 A1 | 4/2007 | Chen |
| 2008/0183560 A1 | 7/2008 | Kaplan et al. |
| 2008/0261622 A1 | 10/2008 | Lee et al. |
| 2008/0288408 A1* | 11/2008 | Jacobsen ................ G06Q 30/02 705/50 |
| 2009/0287546 A1 | 11/2009 | Gillespie et al. |
| 2010/0042493 A1 | 2/2010 | Nino et al. |
| 2011/0320259 A1 | 12/2011 | Roumeliotis et al. |
| 2012/0015665 A1 | 1/2012 | Farley et al. |
| 2013/0179114 A1 | 7/2013 | Weiss |
| 2014/0018111 A1 | 1/2014 | Farley et al. |
| 2015/0120529 A1* | 4/2015 | Faaborg ................ G06Q 10/083 705/39 |
| 2015/0163766 A1 | 6/2015 | Weiss et al. |

OTHER PUBLICATIONS

Office Action dated May 4, 2015 for U.S. Appl. No. 14/098,769.

Loss leader, from Wikipedia, downloaded from https://en.wikipedia.org/wiki/Loss_leader on Aug. 25, 2015.

Coupon, from Wikipedia, downloaded from https://en.wikipedia.org/wiki/Coupon on Mar. 9, 2015.

* cited by examiner

DEVICE ASSOCIATION-BASED LOCATING METHODS

CROSS REFERENCE TO RELATED APPLICATION(S)

This application is a division of U.S. patent application Ser. No. 14/098,769, filed Dec. 6, 2013, which is incorporated by reference as if fully set forth.

BACKGROUND

There exist a number of methods of tracking and locating devices. For example a cellular communication device, which operates by switching cell towers, can be tracked as a person carrying the device travels. By triangulating cell towers, the position of a cellular device can be determined with a high degree of accuracy. Accurate device location can also be obtained using Global Positioning System ("GPS") tracking. A device incorporating GPS tracking can determine the position of a person, vehicle, or other moving object with a high degree of accuracy and precision.

While accurate tracking methods are available, tracking a device is a potentially resource intensive process with regard to bandwidth and energy consumption. Mobile devices (e.g., smartphones) tend to have limited battery capacity. Frequent device locating by GPS or cell tower triangulation can drain a mobile device battery relatively quickly. It would be desirable to implement other less resource intensive locating processes.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A device locating method is provided. The method includes broadcasting by a first mobile device a signal comprising an identifier associated with the first mobile device. At least a second mobile device receives and measures the signal broadcast by the first mobile device to produce one or more signal measurements. The at least the second mobile device transmits the identifier associated with the first mobile device and the one or more signal measurements to a computing system. The computing system receives the identifier associated with the first mobile device and the one or more signal measurements from the at least the second mobile device. The computing system estimates a location of the first mobile device based on the one or more signal measurements, and the location is transmitted to a user associated with the first mobile device.

A traffic flow determination method is also provided. The traffic flow determination method includes broadcasting by one or more signaling devices a signal including an identifier associated with the one or more signaling devices. One or more mobile receiving devices receive and measure the signal broadcast by the one or more signaling devices to produce one or more signal measurements. The one or more mobile receiving devices transmit the identifier and the one or more signal measurements to a computing system. The computing system receives the identifier and the one or more signal measurements and estimates a location of the one or more mobile receiving devices based on the one or more signal measurements and based on one or more particular positions of the one or more signaling devices. Location information is provided to a user associated with the at least one signaling device based at least on the estimating of the location.

A product ordering method is also provided. The method includes placing an order with a particular product supplier for a physical product. A signal including an identifier is received with a receiving device. A processor determines that the identifier corresponds to the particular product supplier. An indication that the identifier corresponds to the particular product supplier is provided to a user, and the user receives the physical product from a delivery person corresponding to the particular product supplier after it is determined that the identifier corresponds to the particular product supplier.

A computing network is also provided. The network includes a first mobile device configured for broadcasting a signal comprising an identifier associated with the first mobile device. At least a second mobile device is provided which is configured for receiving and measuring the signal broadcast by the first mobile device to produce one or more signal measurements. The at least the second mobile device is further configured for transmitting the identifier and the one or more signal measurements to a computing system. The computing system is configured for estimating a location of the first mobile device based on the one or more signal measurements and transmitting the location to a user associated with the first mobile device.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Embodiments are described below with reference to the drawing figures where like numerals represent like elements throughout.

The term broadcast as used herein means transmitting a signal wirelessly to a plurality of users which may or may not be available or within signal range to receive the signal. The broadcast signal can be encrypted or other techniques can be applied to limit reception or use of the broadcast signal to authorized users.

Figure 1:
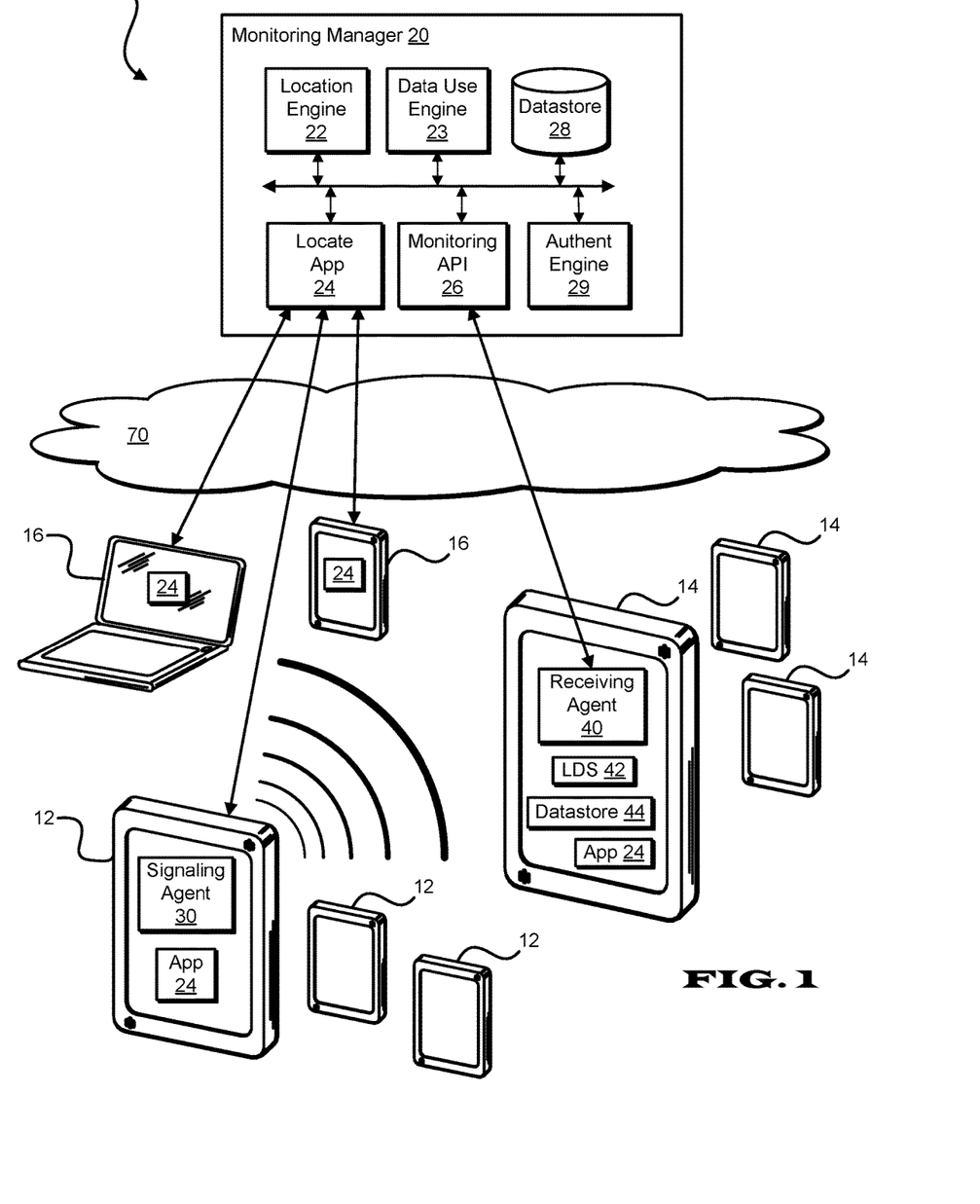
FIG. 1 shows a device locating system.

Referring to FIG. 1, a system 10 is provided including a monitoring manager 20 used for locating a signaling device 12 or receiving device 14. The monitoring manager 20 includes a location engine 22, a data use engine 23, a locate application 24, a monitoring application program interface ("API") 26, a datastore 28, and an authentication engine 29. The monitoring manager 20 and components thereof can be implemented on one or more network-connectable computing systems and need not be implemented on a single system at a single location, but can be decentralized for example in a peer-to-peer configuration. The monitoring manager 20 is configured for communication via a network 70 with other network-connectable computing systems including one or more devices 12 ("signaling devices") and client devices 16 corresponding to a user who can configure the monitoring manager 20 and receive device location information from the monitoring manager 20. Further, the monitoring manager 20 receives data from devices 14 ("receiving devices") which are configured for receiving broadcast signals from signaling devices 12. The locate application 24 can include a web application or other application enabled by the monitoring manager 20 and accessible to a client device 16 or signaling device 12 via a network and/or installed and executed on a client device 16 or signaling device 12. A receiving device 14 can also include the locate application 24 and can function as signaling device 12 or client device 16. For example a single application can enable a particular device to function simultaneously or at different times as a signaling device 12, receiving device 14, or a client device 16.

The network 70 can include one or more wired or wireless networks, including for example the internet and wireless carrier systems. The signaling devices 12, receiving devices 14, and the client devices 16 can each include for example a smartphone, laptop computer or other wired or wireless terminal which can be configured to operate on a wired or wireless telecommunication network. The operation of the monitoring manager 20 is described herein with respect to the devices 12, 14, 16. One skilled in the art will recognize that the monitoring manager 20 can operate with other suitable wired or wireless computing systems.

Software and/or hardware residing on a signaling device 12 enables a signaling agent 30 which controls signaling hardware on the signaling device 12. Signaling hardware on the signaling device 12 enables one or more wireless protocols including for example Bluetooth, Bluetooth Low Energy, WiFi, or other wireless protocol. The signaling hardware enables transmission of a MAC address or other identifier via the signaling agent 30, the identifier uniquely identifying the signaling device 12.

Software and/or hardware residing on each receiving device 14 enables a receiving agent 40 in the form of a client application which can provide information regarding signal received from the signaling device 12 to the monitoring manager 20 via the monitoring API 26. In addition to components enabling data processing and wireless communication, the receiving device 14 includes a location determination system ("LDS") 42 such as a global positioning system ("GPS") receiver, from which the receiving device 14 gathers data used for determining location of the receiving device 14. Alternatively, the receiving device 14 can be provided without a GPS or other location determining system. A user operates the receiving device 14 with the receiving agent 40 active.

Figure 2:
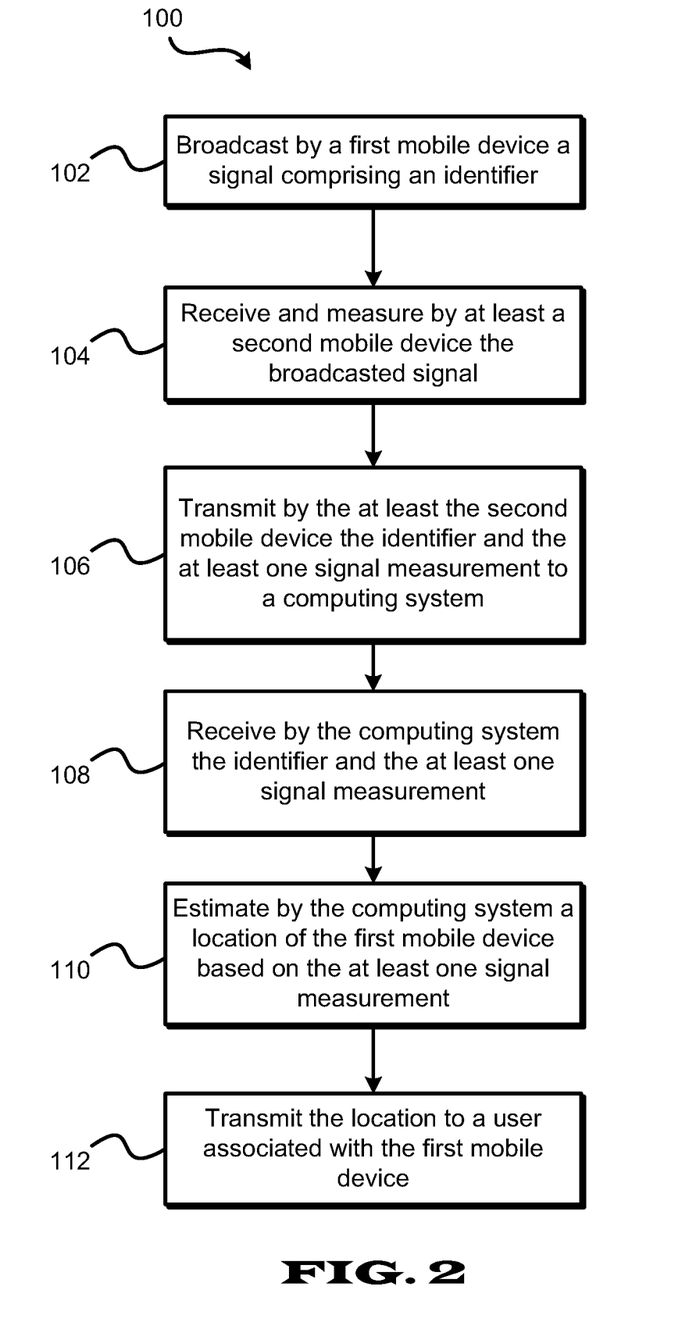
FIG. 2 shows a device locating method.

Referring to FIG. 2, a device locating method 100 is shown. The method 100 is described with reference to the components shown in the system 10 of FIG. 1, including the monitoring manager 20, signaling agent 30, and receiving agent 40, which are preferably configured for performing the method 100 and include or have access to suitable non-transitory data storage including instructions for performing the method 100. The method 100 may alternatively be performed via other suitable systems and devices. The method 100 is not limited to the components shown in FIG. 1 which are merely exemplary.

In a step 102, a first mobile device (hereinafter "signaling device" 12) broadcasts a signal including an identifier associated with the first mobile device. The broadcast from the signaling device 12 can be enabled by the signaling agent 30 and is beneficially continuously broadcast over a period of time. The signal can further include other data including for example location data.

In addition to an identifier, the signal broadcast by the signaling device 12 can include location data, data indicating the health or fitness of an operator of the signaling device 12, or other data. Such data after being received by the receiving device 14 can be transmitted to the monitoring manager 20 for use in determining location and/or for transmission to a user via the locate application 24. The signal broadcast by the signaling device 12 can be encrypted allowing only authorized receiving devices 14 to decode the signal.

In a step 104, at least a second mobile device (hereinafter "receiving device" 14) receives and measures the signal broadcast by the first mobile device to produce a signal measurement. Beneficially, the signal is received and measured by a plurality of receiving devices 14. The signal measurement can include for example a quantification of signal strength, and the receiving device 14 can for example derive a metric describing the strength of the signal. Alternatively, the signal measurement can include an estimated distance from the signaling device 12 to the receiving device 14 or other association between the signaling device 12 and the receiving device 14 providing an indication of the relative proximity of the signaling device 12 to the receiving device 14.

In a step 106, the receiving device 14 transmits the identifier and the at least one signal measurement, for example a signal strength measurement, to a computing system (hereinafter "monitoring manager 20"). Beneficially, the receiving device 14 is location enabled, including the ability to retrieve or determine location based on cell tower triangulation, GPS, communication with one or more WiFi or other wireless access points, or other process. If so enabled, the receiving device 14 can transmit to the monitoring manager 20 its location, for example a location generated by the LDS 42. If the receiving device 14 does not include an LDS 42 or its LDS 42 is inoperable, a user of the receiving device 14 can input the location of the receiving device 14 which can be transmitted to the monitoring manager 20. Alternatively, the monitoring manager 20 can query a telecommunication carrier location service for the location of the receiving device 14. The receiving device 14 can further transmit to the monitoring manager 20 an identifier associated with the receiving device 14, optionally encoded to ensure the privacy of an owner of the receiving device 14, a local time stamp corresponding to when the signal transmitted by the signaling device 12 was received by the receiving device 14, and if available other data associated with the receiving device 14. Other data received from the signaling device 12 such as location data and health/fitness data can also be transmitted by the receiving device 14 to the monitoring manager 20. Moreover, a receiving device 14, for example one which does not include an operable LDS 42, can be located based on signals received from one or more signaling devices 12 of known location, for example using triangulation based on signal strength of received signals from the signaling devices 12. If a plurality of receiving devices 14 receive and measure the broadcast signal, each receiving device 14 transmits the identifier, corresponding signal measurement, time stamp, and other available data to the monitoring manager 20.

When the receiving device 14 receives a signal from a signaling device 12, but is not able to transmit the signal to the monitoring manager 20, the receiving device 14 stores the signal event in a receiving device datastore 44, until such time as the receiving device 14 is able to communicate with the monitoring manager 20.

Beneficially, a first protocol is implemented for broadcasting the signal from the signaling device 12 and a second protocol is implemented for transmitting the identifier and the at least one signal measurement from the receiving device 14 to the monitoring manager 20, the first protocol using less power than the second protocol, and the second protocol corresponding to a greater range than the first signal protocol. For example, the first signaling protocol can correspond for example to a range of 30 meters and the second signaling protocol can correspond to a range of 50 km. For example the signaling device 12 can broadcast using Bluetooth™ or WiFi™ (802.11(a)(b)(g)(n)) and the receiving device 14 can transmit to the monitoring manager 20 using a suitable mobile device standard such as CDMA, TDMA or GSM.

In a step 108, the monitoring manager 20 receives the data transmitted by the receiving device 14 which data can be stored in the datastore 28. In a step 110, the monitoring manager 20 estimates the location of the signaling device 12 based on the at least one signal measurement of the broadcasted signal. The monitoring manager 20 can estimate the location of the signaling device 12 further based on the location of the receiving device 14 if such data is available. The monitoring manager 20 beneficially estimates the location of the signaling device 12 using the location engine 22 based on a plurality of signal measurements from a plurality of receiving devices 14, for example based on a triangulation process. Alternatively, a plurality of positions can be provided to the monitoring manager 20, each position corresponding to one or more signal measurements from one or more receiving devices 14, and the monitoring manager 20 can estimate the location of the signaling device 12 based on a weighted centroid of the plurality of positions. Further, a path of the signaling device 12 over a period of time can be estimated based on signals received over the period of time.

In a step 112, the location of the signaling device 12 is transmitted to a user associated with the signaling device 12. This step can be performed via the locate application 24 of the monitoring manager 20. In the case where a path is estimated, the path can be sent to the user. The user receiving the location information can include for example a user of the signaling device 12 who has lost the signaling device 12, which can be the user's mobile phone or other device with signaling capability. The user can alternatively include a parent of a child in possession of the signaling device 12 or employer of an employee in possession of the signaling device 12. In any case, the user can access the location or path via the locate application 24 using a client device 16 such as a network connectable laptop computer or mobile smart phone. The location can include an indication of how close the user operating a client device 16 is to the signaling device 12, for example using terms "hot" to connote nearness and "cold" to connote farness. Alternatively, the user receiving location information may be in possession of the signaling device 12 and for whatever reason require location determined by this particular process.

The monitoring manager 20 can transmit contact information of the user associated with the signaling device 12 to a receiving device 14 which received the broadcast signal from the signaling device 12. This can be helpful if a user of the receiving device 14 finds a misplaced signaling device 12 and wants to contact an owner of the signaling device 12. An alert can be transmitted to the user associated with the signaling device 12 responsive to one or more receiving devices 14 receiving or measuring the signal broadcast by the signaling device 12. It is also possible for the user associated with the signaling device to define alerts. These alerts can be defined via the monitoring manager 20, which will apply defined rules to incoming signaling device events. When event dependencies of a rule have been satisfied, the rule is executed. The following are non-limiting examples of event rules which can trigger an alert:

1. A signal has been received from the signaling device 12.

2. A signal including signaling device 12 location, has been received from the signaling device 12.

3. A signal, or multiple signals, with location, have been received, a weighted centroid has been derived, and the radius within which the signaling device 12 is located, is less than a user defined threshold.

4. Multiple signals with location have been received, a path has been derived, and an extrapolation of the path has been flagged for an alert.

An alert can be transmitted via the application 24 to the signaling device 12 or other client device 16. The alert can be a push message or pull message from the monitoring manager 20 and can notify the user associated with the signaling device 12 that one or more receiving devices have received the signal and can provide the determined location.

Figure 3:
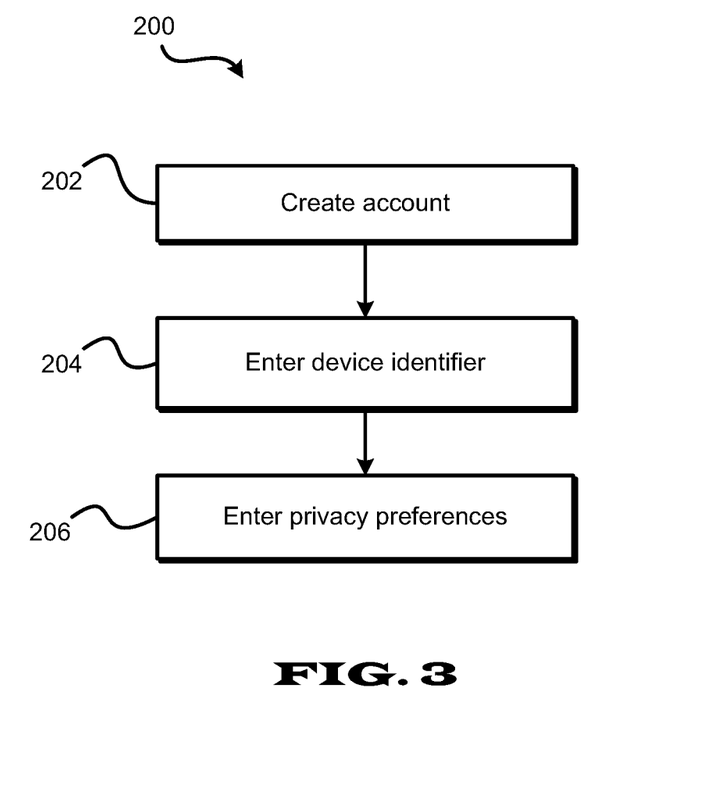
FIG. 3 shows an account setup process.

The steps for which a signaling device 12 is enabled into the monitoring manager 20, for example during a setup process, are described as follows with reference to the process 200 of FIG. 3. The process 200 can be initiated responsive to executing the application 24 on the signaling device 12, receiving device 14, or client device 16. In a step 202, the user associated with the signaling device 12 (e.g. the device owner) creates an account on the monitoring manager 20. This account includes at least a phone number of the user, email of the user, and an identifier that enables the monitoring manager 20 to contact the user. The account also includes a password that ensures the security of the account and security of the signaling devices 12 associated with the account. Alternatively, an account is not created by the user.

In a step 204, the user associated with the signaling device 12 enters the identifier of the signaling device 12 into the monitoring manager 20, and associates this with the account identifier, or some other identifier, of the user. Optionally, the user can associate an identifier corresponding to their locate application 24 with the account. This identifier can include for example the user's mobile phone number, home phone number, or computer IP address.

In a step 206, the user can enter privacy preferences to control what data is accessible to receiving devices 14. For example, the user can limit receiving devices 14 to having no access to any data that describes the signaling device 12. Alternatively, the user can permit the signaling device 12 identifier, the signaling device 12 location, a count of the number of events generated by the signaling device 12, or any other data or analytics derived from the signaling device 12 to be available to the receiving device 14.

The user associated with the signaling device 12, for example the signaling device 12 owner, can query the monitoring manager 20 through the locate application 24 in a secure and private fashion. Responsive to a query or during normal operations, the monitoring manager 20 can derive analytics describing events collected with respect to the signaling device 12 and provide these to the user. An exemplary analytic which can be reported to the user includes an indication that no events were received for the signaling device 12. Another exemplary analytic includes that one or more events were received, with associated timestamps for when the signaling device 12 signal was received by particular receiving devices 14.

Another exemplary analytic which can be reported includes location based on signal strength, wherein location and signal strength data associated with the signaling device 12 or the receiving device 14 is used to determine where the signaling device 12 was at the time it was detected by the receiving device 14. If the upper bound on the signal transmission range of the signaling device 12 is well defined, the signal strength can be used to derive the actual distance that the receiving device 14 is from the signaling device 12.

Another exemplary analytic which can be reported is device location based on multiple location tuples or multiple signal strength tuples, which can provide a more accurate location for the signaling device 12 than individual tuples. A weighted centroid algorithm as described for example in U.S. patent application Ser. No. 13/345,118, which is incorporated by reference as if fully set forth, can provide an effective location based on multiple data points. Another exemplary analytic which can be reported is path of the signaling device 12. If the signaling device 12 is moving, then subsets of the above tuples can be used to determine a series of distinct locations, which through the respective time stamps on the associated signals, can be used to define a path for the signaling device 12 over time.

In another exemplary analytic, for a collection of stationary signaling devices 12 distributed over a fixed area, the monitoring manager 20 can accumulate associations between receiving devices 14 and signaling devices 12, and create a heat map to show which signaling devices 12 are engaging with receiving devices 14, and include the relative proximity of the receiving devices 14 and the signaling devices 12. Further, other data associated with a signaling device 12 can be analyzed with respect to the time it was received by the receiving device 14 to generate analytics which can be reported to a user.

The herein described processes can be performed for example as a part of a service offered by a telecommunication carrier. In such case, data signals transmitted by receiving devices 14 in performing the above-described processes would be a service to the telecommunication carrier, and not to the owner of the receiving device 14. The monitoring manager 20 via the data use engine 23 can distinguish these aspects of data usage from aspects of data usage that are incurred by the owner of the receiving device 14 to allow a telecommunication carrier to preclude charges to the receiving device 14 owner based on processes described herein.

Figure 6A:
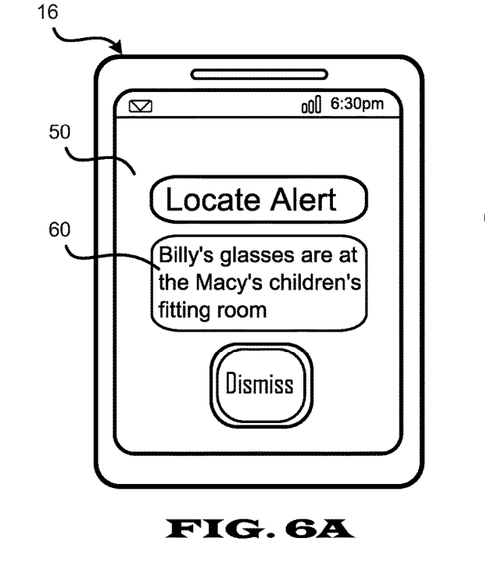
FIGS. 6A-6D and 7 show devices with example screen displays pursuant to described methods.

A non-limiting example implementation of the method 100 follows. A signaling device 12 is attached to a child's pair of glasses. While walking in a department store, the child loses the glasses. Near the location the glasses were lost, receiving devices 14 (e.g. cell phones) that receive a signal from the signaling device 12 send a signal to the monitoring manager 20. Signals from a receiving device 14 include signal strength measurements of the signaling device 12 signal and location of the receiving device 14 at the time the signal from the signaling device 12 was detected. The parent queries the monitoring manager 20 for all events of the signaling device 12 with their associated location. The monitoring manager 20 computes a weighted centroid of the locations using the associated signal strength to determine the location of the glasses with a high degree of accuracy. Referring to FIG. 6A, an example alert message 60 pursuant to this example indicates the location to the parent on interface 50 of a client device 16 referencing an appropriate landmark in the area. The example alert message 60 states "Billy's glasses are at the Macy's children's fitting room".

Figure 6B:
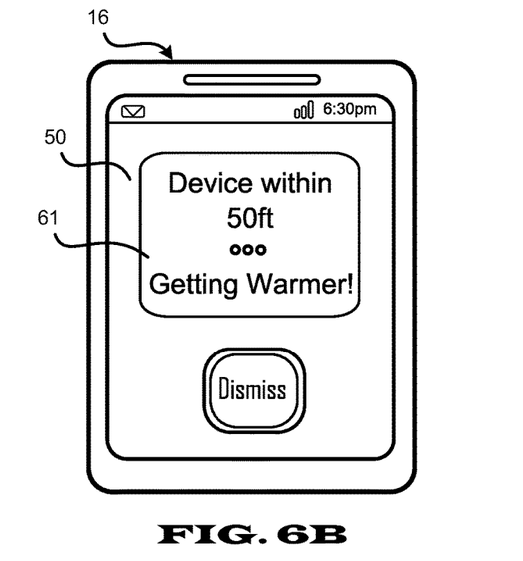

Another non-limiting example implementation of the method 100 follows. A signaling device 12 is put in a vehicle. The owner of the signaling device 12 parks the vehicle at a shopping mall and walks into a store in the mall. While the owner is in the mall, signal receiving devices 14 receive a signal from the signaling device 12 and send the signal to the monitoring manager 20 which derives the location of the signaling device 12 and hence the vehicle, based on data received from the receiving devices 14. After finishing shopping the owner realizes that he has forgotten where his car is parked. The owner logs into his account on the monitoring manager 20 using a client device 16 and looks up the derived location of the signaling device 12 in the vehicle, and hence the location of the vehicle. The application 24 can be used to guide the owner to the car, wherein the application 24 shows increasing effects, e.g. deeper red, as the owner is moving closer to the signaling device 12 and decreasing effects, e.g. deeper blue, to indicate that the owner is moving farther away from the signaling device 12. Referring to FIG. 6B, an example message 61 pursuant to this example indicates a proximity of the owner to his vehicle on an interface 50 of a client device 16. The example message 61 states "Device within 50 ft . . . . Getting Warmer!"

Figure 6C:
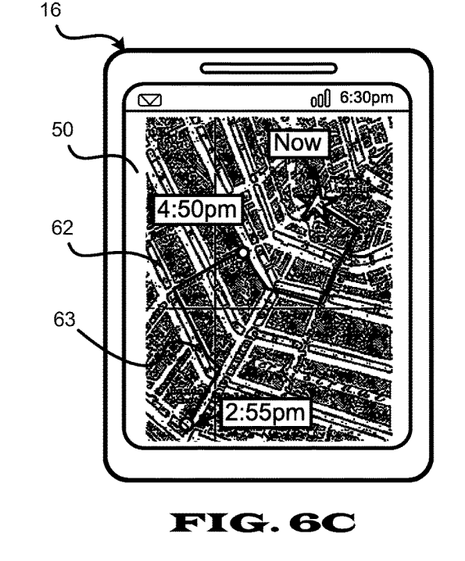

In another non-limiting example of the method 100, a signaling device 12 is placed on a dog. The location of the dog is continually determined through the signal sent by the signaling device to nearby receiving devices 14. When the dog becomes lost, the owner of the dog and signaling device 12 logs in to her account on the monitoring manager 20, and based on timestamps on collected signal events, is provided information including where the dog has been, the path of the dog, and where the dog is currently. Referring to FIG. 6C, an example map 62 pursuant to this example is provided on an interface 50 of a client device 16. The example map 62 provides a path 63 of the dog with associated times ("2:55 pm", "4:50 pm") at which the dog was at particular positions along the path as well as the dog's present position ("Now").

Figure 6D:
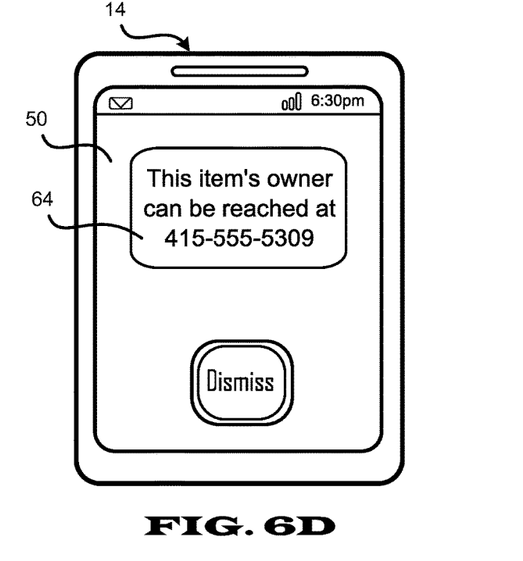

In another non-limiting example of the method 100, an owner of a signaling device 12 attaches the signaling device 12 to her briefcase. The owner forgets the briefcase at the airport. The owner enables access by receiving devices 14, owned by other entities, to the phone number of the owner of the signaling device 12, which phone number corresponds to a client device 16. The briefcase is found by a flight attendant. When the flight attendant checks his receiving device 14, he can see the phone number of the owner of the signaling device 12. The flight attendant calls the owner of the signaling device 12 on her client device 16 telling her that the briefcase has been found. Referring to FIG. 6D, an example message 64 pursuant to this example indicates the phone number of the owner of the signaling device 12 on an interface 50 of a receiving device 14. The example message 64 states "This item's owner can be reached at 415-555-5309". To protect the privacy of the owner of the signaling device 12, the flight attendant can alternatively be provided a link to contact the owner of the signaling device 12 through the monitoring manager 20, for example via a masked email, masked text message, or masked voice messaging service.

Figure 4:
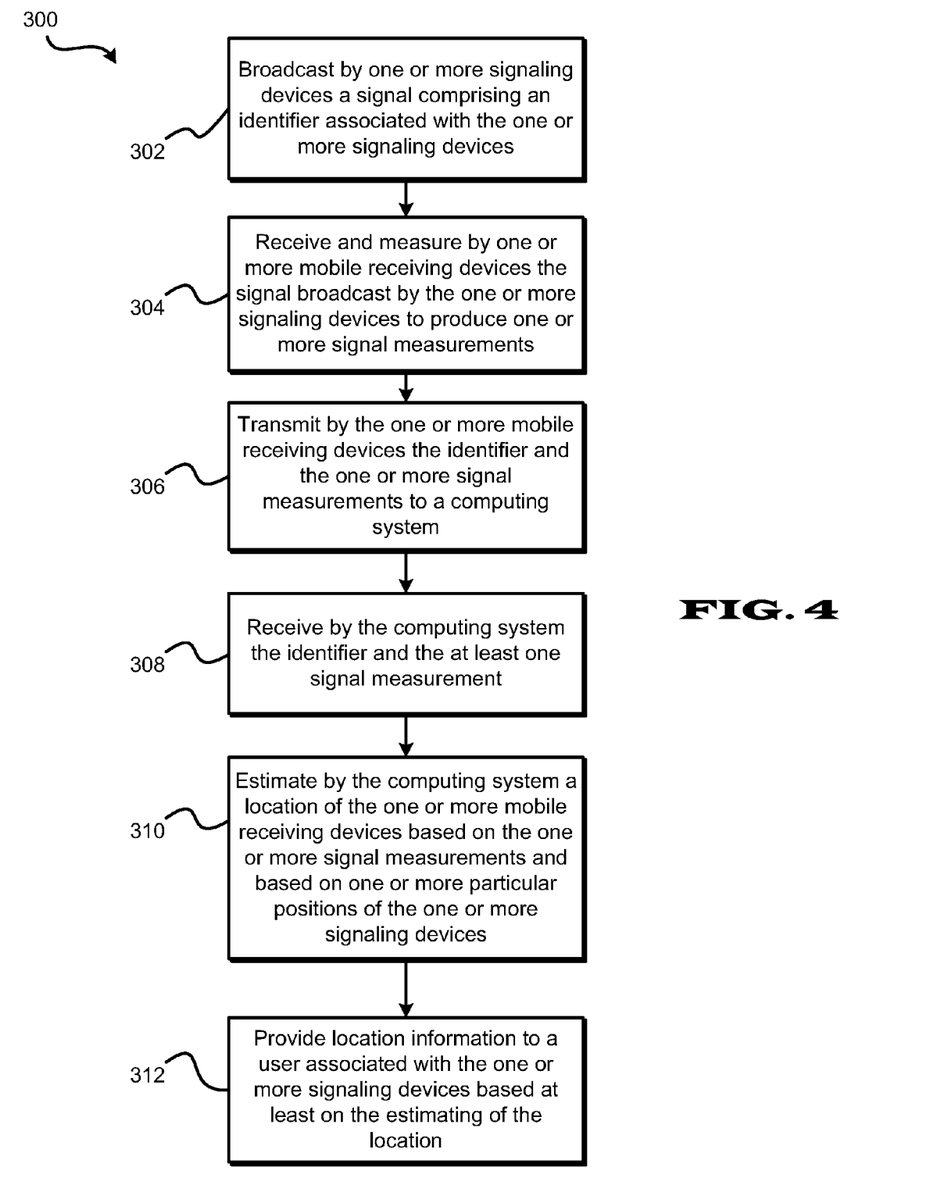
FIG. 4 shows a traffic flow determination method.

Referring to FIG. 4, a traffic flow determination method 300 is shown. The traffic flow can correspond to foot traffic, vehicle traffic or other movement of a plurality of individuals, objects, or entities. The method 300 is described with reference to the components shown in the system 10 of FIG. 1, including the monitoring manager 20, signaling agent 30, and receiving agent 40, which are preferably configured for performing the method 300 and include or have access to suitable non-transitory data storage including instructions for performing the method 300. The method 300 may alternatively be performed via other suitable systems and devices. The method 300 is not limited to the components shown in FIG. 1 which are merely exemplary.

The method 300 includes broadcasting by one or more signaling devices a signal comprising an identifier associated with the one or more signaling devices 12 (step 302) and receiving and measuring by one or more mobile receiving devices 14 the signal broadcast by the one or more signaling devices 12 to produce one or more signal measurements (step 304). The one or more mobile receiving devices transmit the identifier and the at least one signal measurement to a computing system, for example the monitoring manager 20 (step 306). The computing system receives the identifier and the one or more signal measurements (step 308). The computing system (hereinafter the "monitoring manager 20") estimates a location of the one or more mobile receiving devices based on the one or more signal measurements and based on at least one particular position of the one or more signaling devices (step 310). Location information is provided to a user associated with the one or more signaling devices based at least on the estimating of the location (step 312).

The signaling devices 12 can be permanently positioned or mobile. Particular positions of the signaling devices 12 can be determined by the user, the signaling device 12, or the monitoring manager 20 prior to estimating the location of the receiving devices 14. These positions can be associated with the identifier or identifiers which are respectively associated with the signaling devices 12. A determined position of a signaling device 12 can be relative to one or more other signaling devices 12 and need not be an absolute coordinate. Such position can be determined based on data provided by a user of the signaling device, for example in an initiation procedure. In such a manner one or more points of reference exist for calculating location of the receiving devices 14, whether it be an absolute geographic coordinate or relative to one or more signaling devices 12 in a particular area corresponding to the signaling devices 12. The monitoring manager 20 can determine an amount of time a receiving device 14 remains in a particular area and transmit this information to the user associated with the signaling devices 12. The monitoring manager 20 can determine a number of receiving devices 14 in a particular area and transmit this information to the user associated with the signaling devices 12. Location information need not be immediately sent to a user after estimating location. Estimated locations can be stored, for example in the datastore 28 of the monitoring manager 20, and used for deriving later analytics. For example, responsive to a user query, stored location data can be used to generate a heat map showing receiving device 14 traffic in the proximity of a plurality of signaling devices 12. Moreover, location information need not include exact geographic coordinates. Location information can include a description relative to a particular point of reference. For example, a location provided to a user could be "the lingerie department of the shopping mall" or "50 feet east of the park gazebo".

In a non-limiting example of the method 300, a store owner wants to determine the foot traffic flow of customers in a store. The store owner attaches a plurality of signaling devices 12 to fixed locations within the store. The store owner associates the location of each signaling device 12 with an identifier of the device in the monitoring manager 20. Note that during operation it is not necessary for the signaling devices 12 to broadcast their location, as their location is stored in the datastore 28 of the monitoring manager 20. Each signaling device 12 simply signals its identifier. Customers in the store that have a receiving agent 40 enabled by application software on their cell phones (receiving devices 14) detect the signals from the signaling devices 12. For each received signal from a particular signaling device 12, a receiving device 14 sends a signal to the monitoring manager 20 that includes the identifier of the signaling device 12, signal strength of the signaling device signal at the time the signal was detected, and a timestamp corresponding to when the signal was detected by the receiving device 14. The store owner uses this data to determine where and at what time foot traffic occurs in the store. This information can also be correlated with merchandise that is at particular locations in the store. This data can be stored in the datastore 28 of the monitoring manager 20 for access by the store owner.

In another non-limiting example of the method 300, a signaling device 12 is placed on a public monument, with public access to all data and analytics available to receiving devices 14 including cell phones of tourists with a receiving agent 40 enabled by application software. Receiving devices 14 receive data and analytics regarding the signaling device 12 such as how many receiving devices 14 corresponding to other tourists have been near the monument and the average amount of time spent by each receiving device 14 at the monument.

Figure 5:
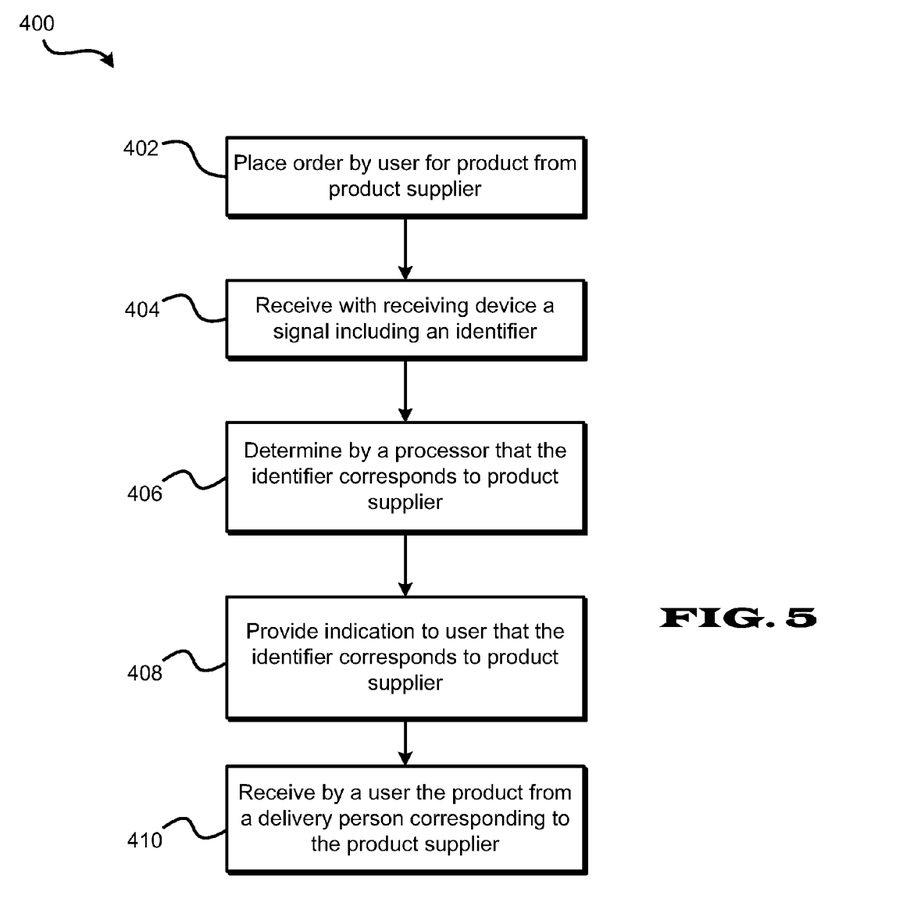
FIG. 5 shows a product ordering method.

Referring to FIG. 5, a product ordering method 400 is shown. The method 400 is described with reference to the components shown in the system 10 of FIG. 1, including the monitoring manager 20, signaling agent 30, and receiving agent 40, which are preferably configured for performing the method 400 and include or have access to suitable non-transitory data storage including instructions for performing the method 400. The method 400 may alternatively be performed via other suitable systems and devices. The method 400 is not limited to the components shown in FIG. 1 which are merely exemplary.

The method 400 includes placing an order with a particular product supplier for a physical product (step 402). The method further includes receiving with a receiving device 14 a signal comprising an identifier (step 404) and determining by a processor that the identifier corresponds to the particular product supplier (step 406). The signal can be a short range (e.g., WiFi, Bluetooth) signal transmitted by a signaling device 12 to the receiving device 14. The processor can be included on the receiving device 14 or the monitoring manager 20. A user is provided an indication that the identifier corresponds to the particular product supplier (step 408). The indication can be provided by the receiving device 14 in a user interface. The method further includes receiving by the user the physical product from a delivery person corresponding to the particular product supplier after determining that the identifier corresponds to the particular product supplier (step 410). The receiving device 14 can transmit the identifier to the monitoring manager 20 via a network, and the monitoring manager 20 can authenticate the identifier using a processor enabled for example by the authentication engine 29. Alternatively, data for authenticating the identifier is received from the monitoring manager 20 by the receiving device 14 and used by the receiving device 14 to authenticate the identifier.

Figure 7:
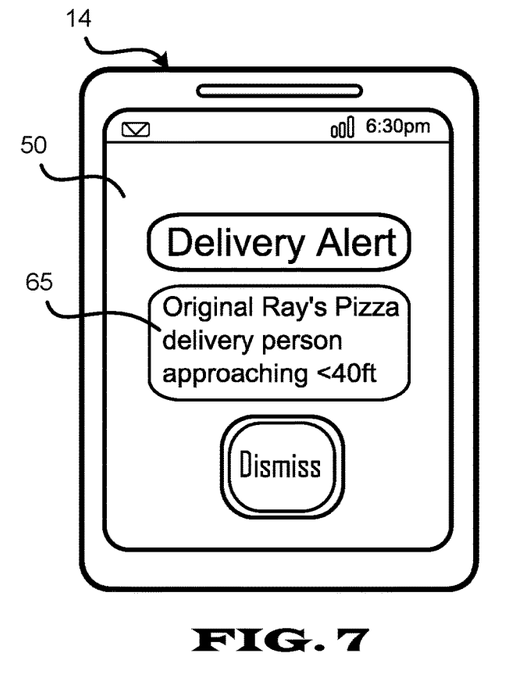

A non-limiting example implementation of the method 400 follows. A pizza delivery person carries a signaling device 12 such as a smart phone on his person which broadcasts an identifier that identifies his association with Original Ray's Pizza, a local restaurant with delivery service. A homeowner orders a pizza from Original Ray's Pizza. The delivery person comes to the door of the homeowner carrying a pizza and the broadcasting signaling device 12. The homeowner has a receiving device 14 such as a smart phone on his person or in his home that is enabled to receive the identifier of the signaling device 12 of the pizza delivery person. Responsive to a determination that the identifier corresponds to Original Ray's Pizza, a message is provided on the receiving device 14. An example message 65 on an interface 50 of the receiving device 14 is shown in FIG. 7. And the homeowner, the user of the receiving device 14, feeling safe in knowing the person at the door is in fact from Original Ray's Pizza, opens the door and receives the delicious pizza.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A product ordering method comprising:
   providing a product ordering application to a user for installation on a computing device, the computing device comprising signal receiving hardware;
   enabling placement of a product order to a particular product supplier using the computing device;
   receiving by the computing device via the product ordering application a wireless signal broadcast corresponding to a first signal protocol from a mobile signaling device, the wireless signal broadcast comprising an identifier associated with the mobile signaling device;
   measuring by the computing device the wireless signal broadcast to produce at least one signal measurement;
   transmitting by the computing device via a second signal protocol the identifier associated with the mobile signaling device and the at least one signal measurement to a computing system via a network;
   determining by the computing system that the identifier corresponds to the particular product supplier based on data for authenticating the identifier stored by the computing system;
   estimating a location of the mobile signaling device by the computing system based on the at least one signal measurement;
   transmitting by the computing system to the computing device the location of the mobile signaling device and an indication that the identifier corresponds to the particular product supplier; and
   providing the user of the computing device via the product ordering application the location of the mobile signaling device and the indication that the identifier corresponds to the particular product supplier.

2. The product ordering method of claim 1, wherein the first signal protocol corresponds to at least one of wireless protocol.

3. The product ordering method of claim 1, wherein the second signal protocol corresponds to a greater range than the first signal protocol.

4. The product ordering method of claim 1, wherein the wireless signal broadcast broadcasted by the mobile signaling device is broadcast substantially continuously for a particular time period.

5. The product ordering method of claim 1, further comprising:
   transmitting by the computing device a position of the computing device to the computing system; and
   estimating the location of the mobile signaling device by the computing system further based on the position of the computing device.

6. A product ordering method comprising:
   providing a product ordering application to a user for installation on a computing device, the computing device comprising signal receiving hardware;
   enabling placement of a product order to a particular product supplier via the product ordering application using the computing device;
   receiving by the computing device via the product ordering application a wireless signal broadcast corresponding to a first signal protocol from a mobile signaling device, the wireless signal broadcast comprising an identifier associated with the mobile signaling device;
   measuring by the computing device the wireless signal broadcast to produce at least one signal measurement;
   receiving data for authenticating the identifier from a remote computing system by the computing device via a network via a second signaling protocol;
   determining that the identifier corresponds to the particular product supplier via the product ordering application on the computing device based on the data for authenticating the identifier received from the remote computing system via the network;
   estimating a location of the mobile signaling device by the computing device based on the at least one signal measurement; and
   providing the user of the computing device via the product ordering application the location of the mobile signaling device and an indication that the identifier corresponds to the particular product supplier.

* * * * *